UNITED STATES PATENT OFFICE.

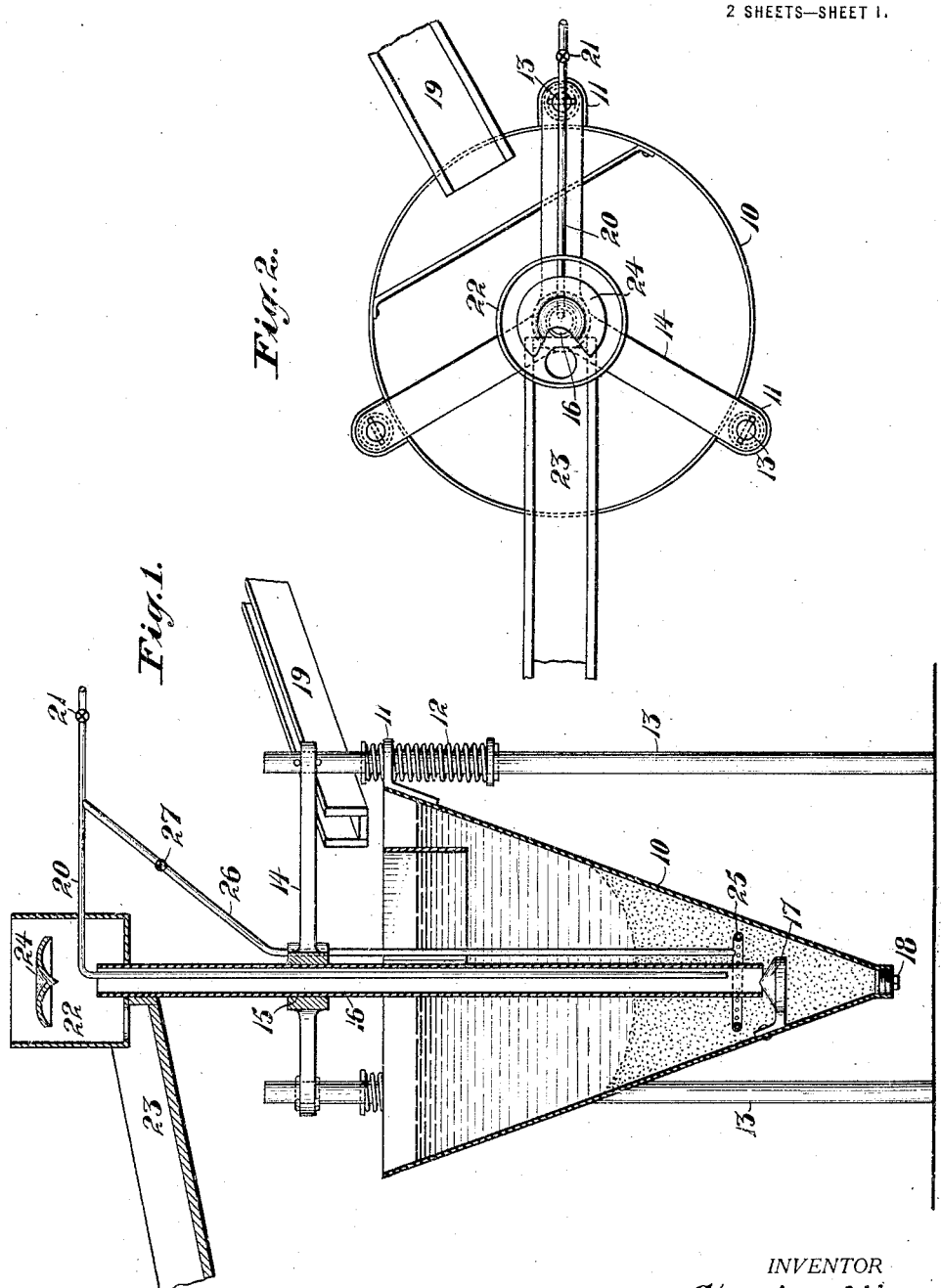

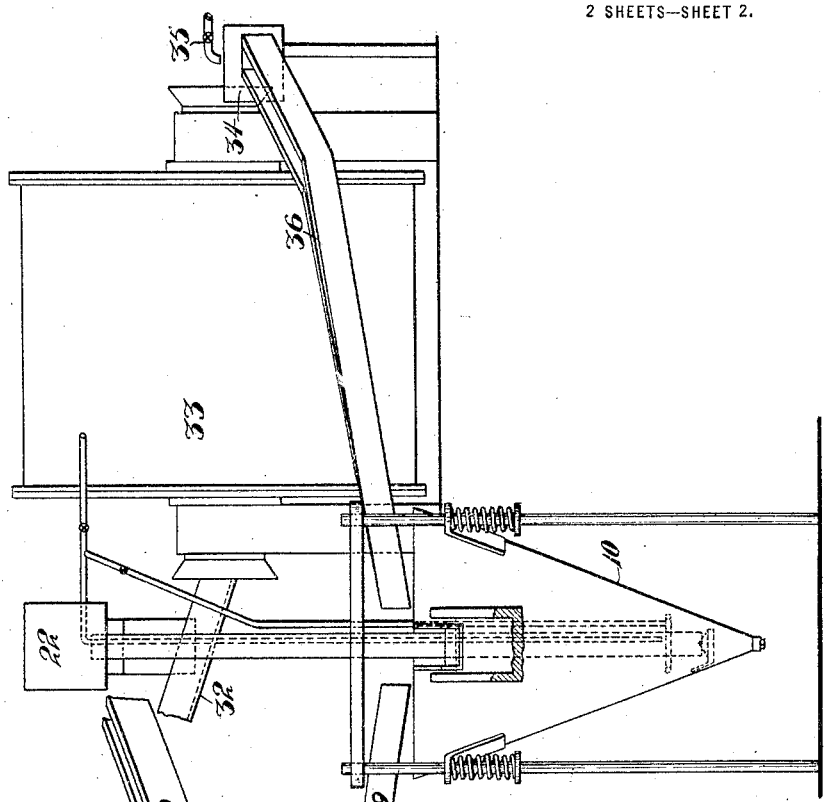
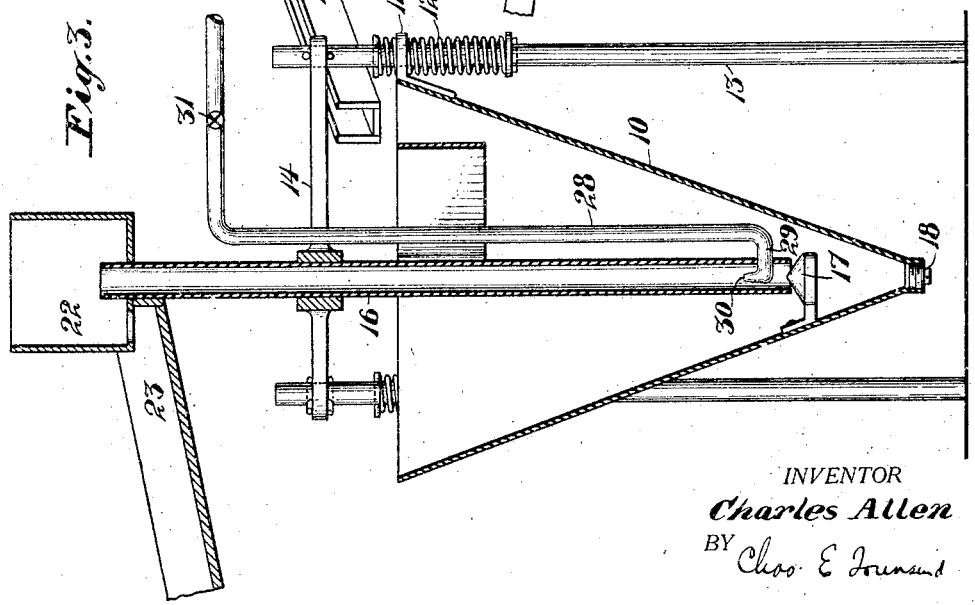

CHARLES ALLEN, OF EL PASO, TEXAS.

AUTOMATIC SEPARATOR AND EVAPORATOR.

1,374,135.                Specification of Letters Patent.         Patented Apr. 5, 1921.

Application filed June 8, 1920. Serial No. 387,482.

*To all whom it may concern:*

Be it known that I, CHARLES ALLEN, a citizen of the United States, residing at El Paso, in the county of El Paso and State of Texas, have invented a new and useful Improvement in Automatic Separators and Evaporators, of which the following is a specification.

This invention relates to automatic separators or evaporators for use in the separation of solids in suspension or two non-miscible liquids of different densities or specific gravity and also for the concentration of solutions by evaporation where the density increases with the concentration.

The device embodies an air-lift or jet ejector for the settled or concentrated material and the object is to automatically control or regulate the intake of the ejector in accordance with the quantity of settled or concentrated material in the vessel.

In the accompanying drawings,

Figure 1 shows a vertical central sectional view of one form of device embodying my invention.

Fig. 2 shows a plan view of the same.

Fig. 3 shows a vertical central sectional view of a modified arrangement thereof.

Fig. 4 shows a diagram of a closed grinding circuit using the device of the present invention.

As here shown, I employ a cone-shaped settling vessel 10 yieldingly supported by counterweights or springs, but preferably suspended from three lugs 11 resting on springs 12, the latter being supported by posts 13. A three-armed spider 14 is also carried by the posts 13 and has a central opening 15 to form a bearing for a vertical pipe 16 which extends downwardly within the vessel to a point near the bottom thereof where it co-acts with a valve 17 fastened to the interior of the vessel. The vessel is closed at its bottom by a clean-out plug 18 and the only escape for the accumulated material in the bottom thereof is through the vertical pipe 16. In place of the valve 17, I may extend the pipe 16 farther down to engage the inclined sides of the tank 10.

Material is continuously fed into the tank through a feed launder 19, the lighter and more slowly settling particles overflowing the vessel and the heavier and more quickly settling particles accumulating in the bottom of the tank. Normally, the tank is kept elevated by the springs 12 so that the lower end of the vertical pipe 16 is closed by the valve 17. When, however, the accumulated material in the bottom of the tank reaches a predetermined weight or mass, the springs are compressed and the tank descends sufficiently to cause the lower end of the pipe 16 to be uncovered and permit the accumulated material to enter said pipe 16.

To elevate the material in the pipe 16 and cause the discharge thereof at the upper end, I employ fluid pressure means which, as shown in Fig. 1, comprises an air pipe 20 extending from a source of supply not shown and passing downwardly within the pipe 16 to a point near the bottom thereof. A valve 21 controls the admission of air to said pipe 20. In operation, air is admitted continuously to the pipe 16 at a point above the bottom thereof. Consequently the weight of the column outside of the pipe 16 is greater than the weight of the column within said pipe, and the effect of the air will be to lift the material therein and discharge it at the top of the pipe into a receptacle 22 from which it passes into a launder 23. A deflecting plate 24 overlies the pipe 16 and prevents the material from falling back into the pipe or on to the material issuing therefrom.

When desired, and to prevent the packing of material around the bottom of the pipe 16, I may arrange a perforated pipe 25 around the bottom of the pipe 16 and force air or water therethrough by means of a branch pipe 26 extending downwardly within the vessel outside of the pipe 16. A valve 27 controls the admission of fluid from the main supply pipe 20 to the branch pipe 26.

In Fig. 3, I substitute for the air lift, a hydraulic jet in the form of a water supply pipe 28 extending from a source of supply downwardly within the tank outside of the pipe 16 and having a bent lower end 29 passing through the side wall of the pipe 16 and terminating in a jet nozzle 30 within said pipe 16. A valve 31 controls the admission of water to the pipe 28.

All apparatus for elevating fluids by injecting fluid pressure into the lower end of a vertical pipe operate with the discharge pipe submerged for a portion of its length. The receptacle in which the pipe is submerged is called the "well". For good efficiency, the necessary submergence is considerable, although it varies with the lift desired, being about 66% of the total length of the pipe for a lift of 20 feet and about 41% for a lift of 500 feet. The percentage means the ratio of the submerged portion to the total length of the column between the point of admission of fluid pressure and the point of discharge of the elevated material from the column. The lift of the material is the distance from the surface of the material in the well to the point of discharge of the lifted material. When an air-lift is used to elevate the discharge from the spigot of a spigot discharge classifier, the lift cannot be less than the vertical distance from the spigot of the classifier to the point at which the elevated material is discharged. With the type of classifier shown herein and fitted with an interior air-lift, the tank 10 forms the well and thereby the lift is reduced to the vertical distance from the surface of the contents of the tank to the point of discharge of the material from the pipe 16. The necessity for a separate well is dispensed with and the floor space needed is considerably lessened, thereby materially reducing the cost of elevating material.

The sand trap classifier fitted with an interior automatically controlled air lift is admirably adapted to the building of stock piles or dams. The solids entering the device are classified and the coarser particles discharged as a separate product, or the sands are discharged as unclassified when that is desired, in a sufficiently and uniformly dewatered condition to pile up into cones or dams. The sands are discharged from the device at such a height that the stock piles or dams so built will be higher than the classifier making the separation or the launder that carries the feed stream to the classifier. The resulting advantages are obvious, for when a spigot discharge classifier is used for this purpose, the discharge from the classifier cannot build a stock pile or a dam higher than the spigot of the classifier. In the present invention, the material does not discharge through a spigot orifice, but is discharged through the pipe 16 and the quantity of material entering said pipe is automatically controlled. The automatic control of the area of the inlet to the fluid pressure column 16 is of great importance and is believed to be broadly new in a device of this class.

Where it is desired to dilute the material discharged through the pipe 16, then the hydraulic jet of Fig. 3 may be used to advantage in place of the air lift shown in Fig. 1.

As shown in Fig. 4, the device of the present invention lends itself admirably for use in closed circuit grinding. The product discharged from the receptacle 22 may be delivered to a launder 32 emptying into a pulverizer 33 such as a ball or tube mill. The discharge from the mill enters a receptacle 34 where it is diluted with water from a valved pipe 35 and passes thence into a launder 36 which returns it to the classifier or sand trap for subsequent treatment.

If the fines and slimes are to be removed from the primary feed before it enters the ball mill, the material will first be fed to the classifier through the launder 19. If, however, the entire unclassified primary feed is to go direct to the ball mill, it will be brought into the circuit by the launder 32. The solids entering the ball mill from the launder 32 will be discharged before all the solids are pulverized to the required fineness, and upon being discharged they will be conducted by the launder 36 to the automatic classifier from which particles of the required fineness and most of the water will overflow and in which those particles needing further comminution will settle until their combined weight causes the tank to sink, thereby opening the inlet to the air-lift column. Thereafter, the settling particles will be discharged by the air-lift into the launder 32 from which they flow into the ball mill for further comminution.

When the primary feed is conducted to the device by the launder 19, it discharges directly into the automatic classifier. The fines and slimes will overflow and the coarser particles will settle until their weight causes the opening of the intake of the air-lift column so that the particles can be elevated and discharged into the launder 32 and thence into the ball mill, returning from the latter through the launder 36 to the classifier. During the circuit, water for the purpose of diluting the material may be introduced through the pipe 35.

While reference is made in the foregoing description to the separation of solids in suspension, it will be evident that the device will function equally as well in the separation of two non-miscible liquids of different density or specific gravity such as oil and water. Also it may be used for the concentration of solutions by evaporation where the density increases with the concentration. Assume that it is desired to concentrate a solution containing 5% free sulfuric acid and 95% water so as to produce a solution containing 60% sulfuric acid. A solution containing 5% sulfuric acid and the remainder water has a specific gravity of approximately 1.032 and weighs 64.5 pounds per cubic foot. A solution containing 60% sulfuric acid and the remainder water has a specific gravity of 1.196 and weighs 74.7 pounds per cubic foot. This difference of 10.2 pounds per cubic foot is available as the actuating force and when multiplied by the number of cubic feet in the vessel is sufficient to cause the device to properly function. In such operations, there would not necessarily be an overflow from the vessel and the evaporated and discharged material could automatically be replaced in an obvious way.

Various changes in the construction and arrangement of the several parts may be employed without departing from the spirit of my invention as disclosed in the appended claims.

Having thus described my invention, what I claim and desire to secure by Letters Patent is:

1. In a device of the character described, a spring supported vessel into which material to be separated or concentrated is fed, a vertical discharge pipe for the accumulated material extending downwardly within the vessel to a point near the bottom thereof and having its lower end adapted to be closed by a stationary part on the vessel seated thereagainst by upward pressure of the springs which support the vessel, the lower end of said discharge pipe remaining closed until such time as the weight of the accumulated material depresses the vessel and uncovers the inlet, and means for admitting fluid pressure to the bottom of the discharge pipe to lift the material entering therein and cause it to be discharged over the top of the pipe.

2. The combination set forth in claim 1, including a receptacle at the discharge end of the pipe and a deflecting plate within the receptacle spaced above the discharge end of the said pipe.

3. In a device of the character described, a vessel into which material to be separated or concentrated is fed, a vertical discharge pipe for the accumulated material in the vessel extending downwardly within the latter to a point near the bottom thereof, means to initially close the inlet end of said pipe, said means being actuated automatically to open the same when the accumulated material reaches a predetermined weight, and a fluid pressure pipe opening into the discharge pipe at a point near the bottom thereof to lift the material therein and cause it to be discharged over the top of said pipe.

In testimony whereof I have hereunto set my hand in the presence of two subscribing witnesses.

CHARLES ALLEN.

Witnesses:
A. H. SWETT,
U. G. WOLFE.